ated June 26, 1956

2,752,264

ASPHALTENE AND DRYING OIL COMPOSITIONS

Marion W. Pickell, Oklahoma City, Okla., assignor to Kerr-McGee Oil Industries, Inc., a corporation of Delaware No Drawing. Application February 3, 1953,
Serial No. 334,969

10 Claims. (Cl. 106—248)

This invention relates to new and useful coating compositions which are both protective and decorative in nature. Besides being useful per se as protective and decorative coating materials, certain coating compositions of the present invention may be readily converted to other improved coating compositions, such as paints, varnishes and enamels by the addition of conventional agents such as resins, pigments, drying oils, drying salts, and solvents.

There are few prior art coating compositions which combine the highly desired characteristics of economy, low raw material cost and compatibility with most of the raw materials used in the paint, varnish and enamel industry, and at the same time are also highly resistant to acid and alkali materials, non-corrosive toward the surface upon which they are applied, weather-resistant and of high electrical insulating value. There is, however, one composition which possesses all of these properties. This composition is one containing gilsonite as a principal constituent. For example, a gilsonite and drying oil composition possesses all of these desirable qualities to a considerable extent.

Gilsonite is one of the purest natural bitumens available and is used in the manufacture of black varnishes, coach varnishes, black baking enamels, japans, insulating compositions and water-proofing compositions. Two counties in the State of Utah are the sole source of commercial quantities of gilsonite in this country. Gilsonite as mined in these counties varies in its properties from one deposit to another and its properties often vary within a given deposit. In addition, many of the more accessible deposits are being depleted. Consequently, the industry is faced with the problem of providing a suitable replacement material for gilsonite in such compositions.

Accordingly, it is a principal object of the present invention to provide coating compositions which are both protective and decorative in nature and are at least equally as good as similar compositions containing gilsonite as an essential constituent thereof.

It is a further object of the present invention to provide a coating composition of the aforesaid type containing materials whose properties are uniform in specification thereby assuring duplication of properties of these compositions.

Still a further important object of the present invention is to provide a coating composition whose constituents may be economically obtained from almost unlimited natural resources.

These and other objects will become more apparent from the following description of my invention.

I have discovered that a coating composition comprising asphaltenes and a drying oil possesses properties equally as good as those of similar gilsonite containing compositions and in some respects possesses properties superior to those gilsonite containing compositions.

Asphaltenes may be obtained from bituminous materials such as steam or vacuum-reduced residues, cracking residues, oxidized (air-blown) asphalts, catalytically oxidized (air-blown) asphalts, native (e. g. Trinidad) asphalts, crude oil containing asphalt, reduced crude oil containing asphalt as well as naturally occurring coal tars and pitches and coal tars and pitches resulting from the destructive distillation of peat, lignite, shales, wood and other organic matter. In view of the many products from which asphaltenes may be obtained, it is believed accurate to state that their raw material supply is almost unlimited.

Asphaltenes may be obtained from these bituminous materials by the use of selective solvents. For example, when asphalt is thoroughly mixed with normal pentane, isopentane, normal hexane, petroleum ether or certain other solvents, the undissolved portions settling out are classified as asphaltenes and the soluble part as a mixture of resinous and oil materials. Since the amount of material which settles out varies somewhat with these solvents, the undissolved portion is sometimes more specifically designated as "normal pentane asphaltenes," "isopentane asphaltenes" etc. Paraffinic hydrocarbons containing from three to eight carbon atoms or mixtures thereof are the most suitable solvents for separating asphaltenes from these bituminous materials in accordance with this method. Pentane and petroleum ether are the preferred solvents of this paraffinic series.

For the purpose of this specification including the claims, the word "asphaltenes" includes bituminous materials or admixtures thereof of a chemical composition the same as the bituminous material constituent which is insoluble on extraction with paraffinic hydrocarbons containing from three to eight carbon atoms or admixtures thereof.

The minimum volume of solvent utilized for obtaining the asphaltenes should be about three volumes of solvent to one volume of bituminous material. The higher the solvent to bituminous material ratio is, the less the contamination of the separated products. Consequently, the maximum amount of solvent utilized is dependent upon economic practicalities. A preferred volume ratio of solvent to bituminous material is 10:1.

Asphaltenes have been found to be compatible with a wide variety of raw materials used in the paint, varnish and enamel industry. A representative grouping of the raw materials with which asphaltenes are compatible includes ester gums, coumarone-indene resins, petroleum resins, gum and wood rosins, rosin residues, vacuum-reduced asphalt, steep roofing (oxidized) asphalt, refined tall oils, varnish makers linseed oils, varnish makers soya oils, kettle bodied fish oils and tung oils.

Typical asphaltenes have a specific gravity of 1.16, a ring and ball softening point range of 320–330° F., a needle penetration hardness at 77° F. of zero, and an average neutralization number of 0.50. They contain only a trace of mineral matter and have a solubility in carbon disulphide of above 99%.

Compositions of asphaltenes including a drying oil have been found to have very little of the gelling and bodying tendencies found in some types and grades of commercial gilsonite compositions including the same drying oil. Thus, certain gilsonite compositions give results ranging from normal viscosity increase to high viscosity increases and in some cases gel depending upon the softening point of the particular gilsonite used and the nature of the other components. However, compositions having their gilsonite component replaced with asphaltenes show no tendency to gel and have only a small normal increase in viscosity.

Short oil varnishes made with asphaltenes show excellent solvent release characteristics and air dry as rapidly as similar short oil varnishes made with gilsonite. All of the common types of driers used in the paint and varnish industry can be used with asphaltene varnishes. As is the case with most bituminous varnishes, the amount of drying salts used in asphaltene varnishes should be increased over the normal amounts used in clear, light-colored varnishes.

Unpigmented films of short oil varnishes made with asphaltenes and various types of gilsonite were tested by exposure in southern Florida and Oklahoma. Results showed that asphaltene varnishes had excellent durability and formed an excellent bond with metal surfaces with no failure due to blistering, face rusting or peeling when examined after six months of out-of-door exposure. In these tests, asphaltene varnishes proved themselves equal to equivalent gilsonite varnishes in all respects.

Asphaltene coating compositions are highly resistant to acid and alkali materials and other corrosive chemicals. In this respect they are equally as good as similar gilsonite compositions. Short oil varnishes made with asphaltenes have high gloss, toughness and good flexibility.

In view of the excellent characteristics of asphaltene drying oil compositions, they are useful in the production of air drying black varnishes and paints, dark colored paints and enamels, acid and corrosion resistant paints and primers, economical shop coats for metals, ready-mixed asphalt aluminum paints, black baking japans, insulating varnishes and coatings, and roof coatings and other building material coating compositions. These compositions are readily prepared by the addition of conventional agents in the same proportions as found in similar gilsonite compositions as illustrated in the examples presented hereinafter.

In summary of the comparison of asphaltene drying oil compositions with gilsonite drying oil compositions, it may be said that they are equally comparable in so far as drying time, alkali and acid resistance, and weathering resistance. The asphaltene drying oil compositions, however, are superior to similar gilsonite compositions, when comparing asphaltenes and gilsonites of the same range of softening points, in the following properties: asphaltenes will make a compatible drying oil composition with heavy kettle bodied oils at normal varnish cooking temperatures while gilsonite will not; asphaltenes, being free of inorganic material such as sand and grit, will make a cleaner drying oil composition than gilsonite; the gloss retention of asphaltene drying oil composition is better than a gilsonite drying oil composition.

Asphaltene drying oil compositions may be used for making aluminum paints having outstanding shelf storage life, leafing ability and bright appearance when applied to a metal surface by spraying. These aluminum paints have the further outstanding property of being non-bleeding when painted with a contrasting color.

The following examples are for the purpose of comparing compositions of the present invention with similar gilsonite containing compositions and for illustrating various paints, varnishes and enamels which may be made with the compositions of the present invention. These examples, however, are for the purpose of illustration and are not limiting to the scope of the present invention which is set forth in the appended claims.

The term "varnish maker's linseed oil" appearing in the following examples is a linseed oil well known to those skilled in the art, and is particularly described in the text "Outlines of Paint Technology," 3rd edition, page 221, by Noel Heaton, published by Charles Griffin and Co., Lt., London 1947.

EXAMPLE 1

The compatibility of asphaltenes was tested in combination with a representative group of drying oils in proportions varying from 3:1 to 1:3. The drying oils tested included crude tall oil, refined tall oil, varnish maker's linseed oil, varnish maker's soya oil, alkali refined fish oil, kettle bodied linseed oil, kettle bodied fish oil, and tung oil. The compatibility of these materials was evaluated by melting the asphaltenes and each raw material together at a temperature of 500 to 575° F., pouring a portion of this hot melt on glass and allowing it to cool. The remainder of the hot melt was thinned with mineral spirits (34 KB value) to 40% non-volatile and when cooled to room temperature was applied as a film to metal panels. Each of these films was examined for compatibility and it was found that asphaltenes were completely compatible with each, there being no physical separation of the drying oil and the asphaltenes.

Various gilsonites were also evaluated for compatibility with the same drying oils in the same proportions and by the same method. The results of these tests showed that gilsonite was also compatible with these oils if its ring and ball softening point was 300° F. or less. However, gilsonites of higher softening points were relatively incompatible with heavy kettle bodied drying oils and consequently, extremely difficult to handle.

EXAMPLE II

The following varnishes were compounded by conventional varnish industry procedures.

*Asphaltene varnish*

| | Percent |
|---|---|
| Asphaltenes | 19.6 |
| Varnish maker's linseed oil | 19.7 |
| Mineral spirits | 59.0 |
| Cobalt naphthenate (6% Co) | 0.3 |
| Manganese naphthenate (6% Mn) | 0.6 |
| Lead naphthenate (24% Pb) | 0.8 |
| | 100.0 |

*Gilsonite varnish*

| | Percent |
|---|---|
| 325° F. softening point (R & B) gilsonite | 19.6 |
| Varnish maker's linseed oil | 19.7 |
| Mineral spirits | 59.0 |
| Cobalt naphthenate (6% Co) | 0.3 |
| Manganese naphthenate (6% Mn) | 0.6 |
| Lead naphthenate (24% Pb) | 0.8 |
| | 100.0 |

Both of the above varnishes were tested and found to be equal in the following properties: drying time, flexibility, resistance to alkali and acid, water resistance, outdoor weathering and accelerated weathering, and adhesion. The asphaltene varnish exhibited superior gloss and gloss retention properties.

EXAMPLE III

An aluminum paint was made by first compounding an asphaltene varnish comprising the following constituents in the proportions recited.

| | Percent |
|---|---|
| Asphaltenes | 15.0 |
| Coumarone resin | 5.2 |
| Varnish maker's linseed oil | 9.8 |
| Kettle bodied linseed oil | 9.8 |
| Mineral spirits | 45.2 |
| High flash aromatic naphtha | 13.5 |
| Cobalt naphthenate (6% Co) | 0.9 |
| Iron naphthenate (6% Fe) | 0.6 |
| | 100.0 |

The above varnish was made into an aluminum paint by pigmenting it with standard aluminum paste ("Alcoa No. 205" paste as produced by the Aluminum Company of America). This material is an aluminum flake pigment. Two pounds of the same were mixed with each gallon of asphaltene varnish as made above. This paint had the outstanding properties of excellent shelf storage life, leafing ability and bright appearance when applied to a metal surface by a conventional spraying method. In addition, this paint when coated with a standard white paint does not bleed.

EXAMPLE IV

A maintenance paint was made by first compounding by conventional varnish industry methods an asphaltene vehicle comprising the following constituents in the proportions recited.

| | Percent |
|---|---|
| Asphaltenes | 14.0 |
| Polymerized petroleum resin | 6.2 |
| Varnish maker's linseed oil | 8.8 |
| Kettle bodied linseed oil | 10.8 |
| Mineral spirits | 57.7 |
| Manganese naphthenate (6% Mn) | 0.9 |
| Lead naphthenate (24% Pb) | 1.6 |
| | 100.0 |

This vehicle was then used in preparing the following brown maintenance paint:

| | Percent |
|---|---|
| Red iron oxide (98% Fe$_2$O$_3$) | 17.0 |
| Talc (400 mesh) | 17.0 |
| Asbestine (400 mesh) | 4.3 |
| Aluminum stearate | 0.5 |
| Asphaltene vehicle (above) | 31.8 |
| Kettle bodied linseed oil | 16.4 |
| Mineral spirits | 11.6 |
| Cobalt naphthenate (6% Co) | 0.5 |
| Lead naphthenate (24% Pb) | 0.7 |
| Zinc naphthenate (8% Zn) | 0.2 |
| | 100.0 |

EXAMPLE V

An enamel containing asphaltenes was prepared by compounding by conventional varnish industry methods an asphaltene varnish comprising the following constituents in the proportions recited.

| | Percent |
|---|---|
| Asphaltenes | 21.0 |
| Varnish maker's linseed oil | 10.0 |
| Kettle bodied linseed oil | 13.1 |
| Mineral spirits | 54.0 |
| Cobalt naphthenate (6% Co) | 0.3 |
| Manganese naphthenate (6% Mn) | 0.5 |
| Lead naphthenate (24% Pb) | 0.9 |
| Zinc naphthenate (8% Zn) | 0.2 |
| | 100.0 |

The above varnish has enough hiding power to be used as a black enamel. Dark colored enamels may be made by grinding in tinctorially strong colored pigments as illustrated by the following dark green enamel.

| | Percent |
|---|---|
| C. P. chrome green pigment | 20.0 |
| Asphaltene enamel varnish (above) | 80.0 |
| | 100.0 |

I claim:
1. A protective and decorating coating composition comprising a fatty drying oil and a bituminous material which exhibits substantial freedom from solvent gelling, the bituminous material consisting of asphaltenes having a needle penetration hardness at 77° F. of substantially zero.

2. A protective and decorative coating composition comprising a fatty drying oil, a solvent thinner and a bituminous material, the bituminous material consisting of asphaltenes having a needle penetration hardness at 77° F. of substantially zero and exhibiting substantial freedom from solvent gelling.

3. A protective and decorative coating composition comprising varnish maker's linseed oil and a bituminous material which exhibits substantial freedom from solvent gelling, the bituminous material consisting of asphaltenes having a needle penetration hardness at 77° F. of substantially zero.

4. A protective and decorative coating composition comprising kettle bodied fish oils and a bituminous material which exhibits substantial freedom from solvent gelling, the bituminous material consisting of asphaltenes having a needle penetration hardness at 77° F. of substantially zero.

5. A protective and decorative coating composition comprising an alkali refined fish oil and a bituminous material which exhibits substantial freedom from solvent gelling, the bituminous material consisting of asphaltenes having a needle penetration hardness at 77° F. of substantially zero.

6. A protective and decorative coating composition comprising a kettle bodied linseed oil and a bituminous material which exhibits substantial freedom from solvent gelling, the bituminous material consisting of asphaltenes having a needle penetration hardness at 77° F. of substantially zero.

7. A protective and decorative coating composition comprising tung oil and a bituminous material which exhibits substantial freedom from solvent gelling, the bituminous material consisting of asphaltenes having a needle penetration hardness at 77° F. of substantially zero.

8. A protective and decorative coating composition comprising a pigment, fatty drying oil, solvent thinner and a bituminous material, the bituminous material consisting of asphaltenes having a needle penetration hardness at 77° F. of substantially zero and exhibiting substantial freedom from solvent gelling.

9. A protective and decorative coating composition comprising a pigment, fatty drying oil, solvent thinner, drying salts and a bituminous material, the bituminous material consisting of asphaltenes having a needle penetration hardness at 77° F. of substantially zero and exhibiting substantial freedom from solvent gelling.

10. A protective and decorative coating composition comprising an aluminum flake pigment, fatty drying oil, solvent thinner, drying salts and a bituminous material, the bituminous material consisting of asphaltenes having a needle penetration hardness at 77° F. of substantially zero and exhibiting substantial freedom from solvent gelling.

References Cited in the file of this patent

UNITED STATES PATENTS

| 1,233,101 | Montwa | July 10, 1917 |
| 2,068,966 | Thurston et al. | Jan. 26, 1937 |
| 2,485,321 | Schiermeyer | Oct. 18, 1949 |
| 2,596,101 | Pritzler | May 13, 1952 |
| 2,687,965 | Schiermeyer | Aug. 31, 1954 |

FOREIGN PATENTS

| 793,642 | France | Jan. 28, 1936 |